(12) United States Patent
Ghassemzadeh et al.

(10) Patent No.: US 10,397,811 B2
(45) Date of Patent: Aug. 27, 2019

(54) WIRELESS CHANNEL SOUNDER WITH FAST MEASUREMENT SPEED AND WIDE DYNAMIC RANGE

(71) Applicant: AT&T Intellectual Property I, L.P., Atlanta, GA (US)

(72) Inventors: Saeed Ghassemzadeh, Andover, NJ (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 223 days.

(21) Appl. No.: 15/293,995

(22) Filed: Oct. 14, 2016

(65) Prior Publication Data

US 2018/0109967 A1 Apr. 19, 2018

(51) Int. Cl.
| | |
|---|---|
| H04B 1/38 | (2015.01) |
| H04W 24/06 | (2009.01) |
| H04B 7/04 | (2017.01) |
| H04B 7/08 | (2006.01) |
| H04B 17/10 | (2015.01) |
| H04B 17/23 | (2015.01) |

(52) U.S. Cl.
CPC .............. *H04W 24/06* (2013.01); *H04B 7/04* (2013.01); *H04B 7/0837* (2013.01); *H04B 17/101* (2015.01); *H04B 17/23* (2015.01); *H04B 17/102* (2015.01); *H04B 17/103* (2015.01)

(58) Field of Classification Search
None
See application file for complete search history.

(56) References Cited

U.S. PATENT DOCUMENTS

| | | | |
|---|---|---|---|
| 3,543,161 A | 11/1970 | Hatton et al. | |
| 6,393,303 B1 * | 5/2002 | Katz | H04B 7/0615 342/359 |
| 6,417,805 B1 | 7/2002 | Hershey et al. | |
| 6,483,814 B1 | 11/2002 | Hsu et al. | |
| 7,515,916 B1 | 4/2009 | Alexander | |

(Continued)

FOREIGN PATENT DOCUMENTS

| | | |
|---|---|---|
| DE | 4233222 | 4/1994 |
| DE | 10162324 | 7/2003 |

(Continued)

OTHER PUBLICATIONS

Maharaj, Bodhaswar T., et al. "A low-cost open-hardware wideband multiple-input-multiple-output (MIMO) wireless channel sounder." IEEE Transactions on Instrumentation and Measurement 57.10 (2008): 2283-2289.

(Continued)

*Primary Examiner* — Tuan A Tran (57) ABSTRACT

An example device includes antennas to receive wireless signals from a wireless transmitter and to output radio frequency signals based upon the wireless signals that are received, low noise amplifiers coupled to the antennas to amplify the radio frequency signals, and a receiver stage to generate, based upon the radio frequency signals, digital representations of the wireless signals that are received via the antennas and to determine a measure a wireless channel parameter from the digital representations of the wireless signals.

20 Claims, 5 Drawing Sheets

(56) References Cited

U.S. PATENT DOCUMENTS

| | | | | |
|---|---|---|---|---|
| 7,801,018 | B2* | 9/2010 | Okuhata | H04B 7/08 370/208 |
| 8,185,062 | B2* | 5/2012 | Rofougaran | H01Q 3/26 343/820 |
| 8,224,253 | B2* | 7/2012 | Ofek | H01Q 1/246 455/63.4 |
| 8,897,340 | B2* | 11/2014 | Negus | H04B 7/0486 375/211 |
| 9,031,147 | B2 | 5/2015 | Kim et al. | |
| 10,031,234 | B1* | 7/2018 | Alexander | G01S 19/215 |
| 10,038,409 | B2* | 7/2018 | Nobbe | H04B 17/12 |
| 2004/0038713 | A1* | 2/2004 | Okawa | H04W 16/28 455/561 |
| 2004/0224637 | A1* | 11/2004 | Silva | H04B 7/04 455/63.4 |
| 2005/0207334 | A1 | 9/2005 | Hadad | |
| 2015/0171513 | A1 | 6/2015 | Chen et al. | |
| 2015/0270879 | A1 | 9/2015 | Chen et al. | |

FOREIGN PATENT DOCUMENTS

| | | |
|---|---|---|
| EP | 1415428 | 3/2006 |
| EP | 2557830 | 9/2014 |
| EP | 2866401 | 4/2015 |
| WO | WO 01/56239 | 8/2001 |
| WO | WO 2006/026799 | 3/2006 |
| WO | WO 2008/129114 | 10/2008 |
| WO | WO 2013/085289 | 6/2013 |

OTHER PUBLICATIONS

Maharaj, Bodhaswar T., et al. "A cost-effective wideband MIMO channel sounder and initial co-located 2.4 GHz and 5.2 GHz measurements." Proceedings.(ICASSP'05). IEEE International Conference on Acoustics, Speech, and Signal Processing, 2005. vol. 3. IEEE, 2005.

Rondeau, Thomas W., et al. "Online modeling of wireless channels with hidden Markov models and channel impulse responses for cognitive radios." Microwave Symposium Digest, 2004 IEEE MTT-S International. vol. 2. IEEE, 2004.

Degli-Esposti, Vittorio, et al. "Ray-tracing-based mm-wave beamforming assessment." IEEE Access 2 (2014): 1314-1325. http://ieeexplore.ieee.org/stamp/stamp.jsp?tp=&arnumber=6942178.

Maccartney, George R., et al. "Indoor office wideband millimeter-wave propagation measurements and channel models at 28 and 73 GHz for ultra-dense 5G wireless networks." IEEE Access 3 (2015): 2388-2424.

* cited by examiner

WIRELESS CHANNEL SOUNDER WITH FAST MEASUREMENT SPEED AND WIDE DYNAMIC RANGE

The present disclosure relates generally to wireless channel measurements, and more particularly to devices, non-transitory computer readable media, and methods for determining measures of wireless channel parameters.

BACKGROUND

A wireless channel sounder is a device for measuring wireless channel related parameters such as complex impulse response, path loss, received signal strength (RSS), excess delay, or root-mean-square (RMS) delay spread, Doppler spread, fade rate, angle of arrival (AoA) and/or angle of departure (AoD), and the like as experienced by a user equipment or base station. In one implementation, a wireless channel sounder may utilize a directional antenna. For instance, to measure AoA using a directional antenna, the antenna may be turned in incremental steps to measure the RSS. The AoA is recorded where the RSS is at a maximum. While this solution is inexpensive, it is a relatively slow measurement technique.

SUMMARY

In one example, the present disclosure discloses a device for determining measures of wireless channel parameters. For example, the device may include antennas to receive wireless signals from a wireless transmitter and to output radio frequency signals based upon the wireless signals that are received, low noise amplifiers coupled to the antennas to amplify the radio frequency signals, and a receiver stage to generate, based upon the radio frequency signals, digital representations of the wireless signals that are received via the antennas and to determine a measure of a wireless channel parameter from the digital representations of the wireless signals.

In another example, the present disclosure discloses a device, computer-readable medium, and method for determining measures of wireless channel parameters. For example, a processor may activate a first plurality of low noise amplifiers that is coupled to a first plurality of antennas, receive a first plurality of wireless signals via the first plurality of antennas and the first plurality of low noise amplifiers, and determine a first measure of a wireless channel parameter based upon the first plurality of wireless signals that is received. The processor may further deactivate the first plurality of low noise amplifiers, activate a second plurality of low noise amplifiers that is coupled to a second plurality of antennas, receive a second plurality of wireless signals via the second plurality of antennas and the second plurality of low noise amplifiers, and determine a second measure of the wireless channel parameter based upon the second plurality of wireless signals that is received.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and devices for determining measures of wireless channel parameters. In particular, examples of the present disclosure describe wireless channel sounders with fast measurement speeds, low noise figures, and improved receiver sensitivities and dynamic ranges over which the wireless channel sounders can correctly measure and characterize the wireless channel parameters operating in any frequency spectrum.

In general, a wireless channel sounder is a device for measuring wireless channel related parameters such as a complex impulse response of the wireless channel, a path loss, an excess delay, a root-mean-square (RMS) delay spread, a Doppler spread, a fade rate, an angle of arrival (AoA) or angle of departure (AoD), and the like as experienced by a user equipment or base station. In addition, the measurements of the wireless channel related parameters under a variety of test conditions enables the modeling of the behavior for these channel parameters under different scenarios and conditions, as well as the simulation and prediction of the performance of a base station or a user equipment under such scenarios and conditions. In one example, a wireless channel sounder of the present disclosure comprises a switched-antenna array with low noise amplifiers (LNAs) coupled to the antennas, or antenna elements, of the switched-antenna array. In one example, the LNAs are used for antenna switching. For instance, to select and de-select antennas, a LNA associated with an antenna is turned on and off using a biasing circuit. In addition, in one example, antenna elements and LNAs are grouped into sectors, e.g., into antenna sector units, with antenna sector units arranged to cover 360 degrees in azimuth. In one example, 360 degree coverage is provided by eight 45 degree (e.g., at half-power beamwidth) antenna sector units. In one example, antenna sector units may be arranged into two levels, each covering 45 degrees in elevation, e.g., from −22.5 degrees below horizon to 22.5 degrees above horizon, and from 22.5 degrees above horizon to 67.5 degrees above horizon, for a total of 16 sector units. In one example, each antenna sector unit may comprise four antennas which may be simultaneously connected to four receivers via a bank of switching LNAs.

In other solutions, wireless channel measurements may be performed using a directional antenna. For instance, to measure AoA using a directional antenna, the antenna may be turned in incremental steps to measure the received signal strength (RSS). The AoA is recorded where the RSS is maximum. While this solution is inexpensive, it is a relatively slow measurement technique. For example, it may take hundreds of seconds to tens of minutes to complete one set of measurements covering 360 degrees in azimuth and 90 degrees in elevation at one particular location away from the transmitter. In contrast, examples of the present disclosure may determine the AoA by calculating a phase difference between wireless test signals received at antenna elements at different positions within the array, and mapping the phase difference(s) to the incident direction of the wireless test signals. Since the phase of a received signal is generally more stable than the received signal strength (RSS), AoA estimation using phase difference calculations can achieve higher accuracy than RSS-based localization approaches. An antenna sector unit having an array with as few as two antenna elements may suffice to measure AoA with moderate accuracy, e.g., up to and including one degree or better accuracy, in either azimuth or elevation. An antenna sector unit with an array of four antenna elements, e.g., arranged in a quad array, may achieve accurate AoA measurements with respect to both azimuth and elevation.

In addition, AoA measurements for a single location may be gathered in as few as 140-175 milliseconds. For example, with a reference clock of 768 MHz and a wireless test signal of 2048 symbols, the acquisition time per four antennas/antenna ports per antenna sector unit may be 2.7 microseconds (1/768 MHz×2048). To increase the performance of the wireless channel sounder, multiple snapshots may be taken per antenna sector, e.g., 32 snapshots, for an acquisition time per sector of 86 microseconds for 32 snapshots. The total acquisition time of 16 sectors may be approximately 2.6 milliseconds, e.g., with an estimate of 75 microseconds per sector for switching LNAs, waiting for LNAs to settle prior to collecting data, etc. For instance, the acquisition time over all sectors may be calculated as (85 microseconds+75 microseconds)*16 sectors=2.6 milliseconds. In addition, since measurements may be taken at all sectors/antenna sector units for wireless test signals from multiple transmit antennas having different orientations (e.g., seven antennas), the acquisition time across all multiple input multiple output (MIMO) positions may be (2.6 milliseconds+20 milliseconds estimated for housekeeping)×7 sectors=140 to 175 milliseconds.

Examples of the present disclosure also improve the overall dynamic range a wireless channel sounder as compared to prior solutions that use PIN (p-type region, intrinsic region, n-type region) diode or mechanical switches for antenna switching. For example, low-noise amplifiers (LNAs) are as fast as solid state switches but with significant gain, e.g., 16 dB or more, as compared to an 8-13 dB insertion loss for a solid state switch, such as a PIN diode switch. For example, a maximum allowable noise at a wireless channel sounder antenna of the present disclosure may be −138 dBm, taking into account thermal noise of −84 dBm/1 GHz, a noise figure of 5 dB, averaging gain of 15 dB, a processing gain of 33 dB and an antenna gain of 11 dBi (e.g., gain relative to isotropic radiator) when LNAs are attached directly to the antennas. In one example, the dynamic range may be 173 dB or better, e.g., assuming for a total effective radiated power of the transmitter ($P_{t\,ERP}$) of 45 dBm and a desired signal to noise ratio (SNR) of 10 dB. This corresponds to communication distances greater than 200 meters in a millimeter wave system. In addition, an overall noise profile of approximately 4 dB is achievable in a wireless channel sounder according to the present disclosure. It should also be noted that microelectromechanical switches (MEMS) may be used in an alternative wireless channel sounder design. However, while MEMS have a lower insertion loss as compared to a PIN diode or other solid state switches, MEMS are relatively slow to switch.

Although examples of the present disclosure are applicable to a wide range of frequency bands, in one example, wireless channel sounders of the present disclosure may relate to centimeter and millimeter wave systems. Due to propagation characteristics of millimeter wave frequencies, the antenna apertures at high frequency are generally larger to achieve sufficient gain. In particular, the gain of antennas is inversely proportional to the wavelength or directly proportional to the center frequency of operation. Antenna switches operating at these frequencies are physically large, lossy, and may provide approximately 40 dB isolation between output ports. In contrast, examples of the present disclosure use biasing circuits to turn LNAs on and off to select associated antennas/antenna elements. In this way, the noise figure of the receiver is reduced as compared to a millimeter wave switch (e.g., each antenna is directly connected to an LNA, rather than to a switch). In addition, the isolation between adjacent sector's antennas (e.g., the cross interference) may be 80 dB or more, as experienced by the receivers. For instance, when an LNA is in the off position, little to no signal will be passed through the LNA.

It should be noted that for illustrative purposes, various wireless channel sounder systems are described herein in connection with particular quantities or values. However, wireless channel sounder systems of the present disclosure may include different quantities of various components, and/or operating parameters which may have any number of different values. For instance, a wireless channel sounder system may have a different number transmit antennas, may have antennas with different beamwidths, may utilize different frequencies, may utilize different transmit powers, and so forth. In addition, a wireless channel sounder system may include a different number of antenna sector units covering a same or a different range in azimuth and/or elevation, may have sectors with different coverages, may have a different number of antenna elements per sector, may have a different desired SNRs, may utilize a fewer number of samples per antenna for a different averaging gain, and so forth. These and other aspects of the present disclosure are discussed in greater detail below in connection with the examples of FIGS. 1-5.

Figure 1:
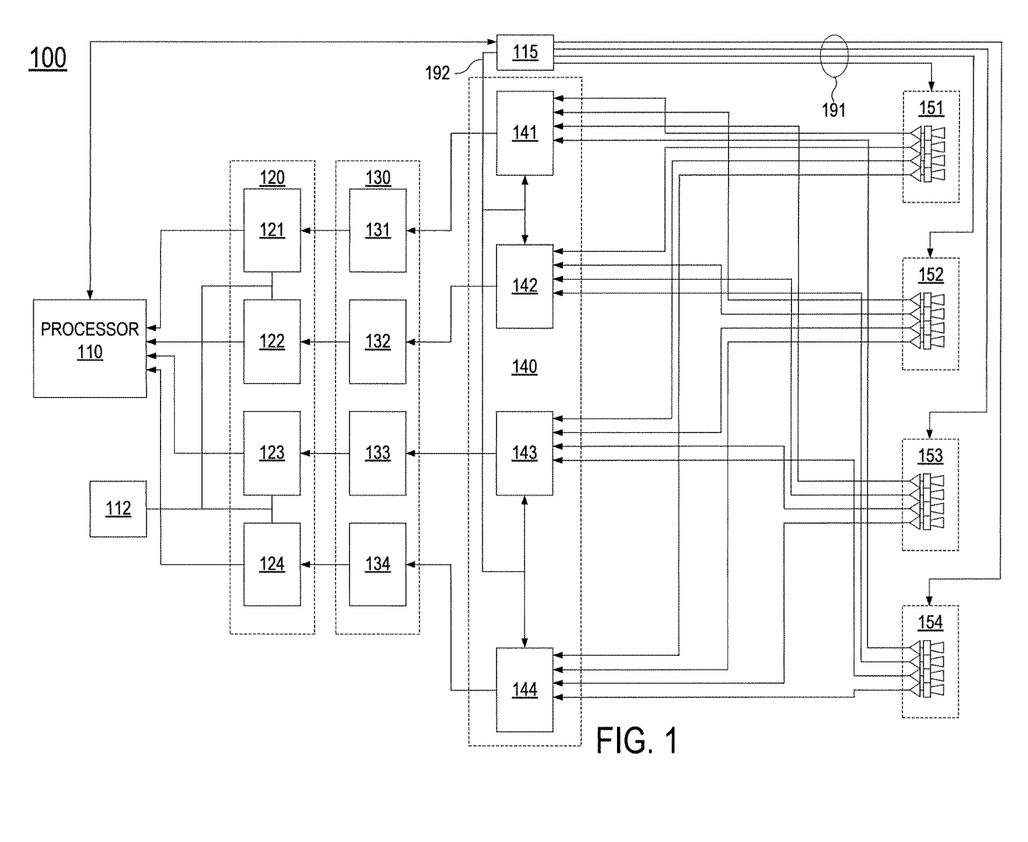
FIG. 1 illustrates a block diagram of an example device, e.g., a wireless channel sounder, in accordance with the present disclosure.

To aid in understanding the present disclosure, FIG. 1 illustrates an example device 100, e.g., a wireless channel sounder, in accordance with the present disclosure. In one example, the device 100 may be used to determine measures of various wireless channel parameters. In one example, the device 100 may be used to receive wireless test signals that are transmitted in an environment, where the wireless test signals, as received, may be used to calculate or determine the measures of various wireless channel parameters such as: multipath amplitude(s), phase(s), direction(s) or angle(s) of arrival, a path loss, an excess delay, a RMS delay spread, a Doppler spread, a fade rate, a complex impulse response of the wireless channel, and so forth. In one example, the transmitter may comprise a switched antenna array with transmitting antennas having different orientations, e.g., a curved array. For instance, in one example, a switched antenna array to transmit wireless test signals may have seven transmitting antennas, each antenna oriented to cover 18.5 degrees of azimuth at half-power beamwidth, which may cover a total of 120 degrees in azimuth (with a small overlap in beamwidth for adjacent antennas in the array).

In one example, a waveform of the wireless test signals transmitted by the transmitter may comprise a periodic repetition of Zadoff-Chu (ZC) sequences according to Equation 1:

$$x[n]=e^{((j\pi u n^2)/L)}, 0 \le n \le L-1 \qquad \text{Equation 1:}$$

where L is the sequence length.

In one example, the transmitter may generate a transmission of pseudorandom noise (PN) code sequences of a length 1092 corresponding to a processing gain of 30 dB (e.g., $10\log_{10} L$, where L is the sequence length) according to a reference clock of 768 MHz). In one example, this may correspond to a 1.4 microsecond sequence block interval. The PN code sequences may be up-converted and amplified (e.g., 20 dB amplification) prior to transmission via one of seven transmit antennas of the transmitter. In one example, the total effective radiated power of the transmitter ($P_{t\ ERP}$) may be 45 dBm.

As illustrated in FIG. 1, the device 100 includes a plurality of antenna sector units 151-154. Each of the antennas sector units 151-154 may include a plurality of antennas, or an "antenna array," and a plurality of low noise amplifiers (LNAs), e.g., four antennas and four LNAs per sector. An example antenna sector unit is illustrated in greater detail in FIG. 2 and discussed below. The respective antenna sector units 151-154 may be activated and deactivated via control lines 191. For instance, timing controller 115 may comprise a biasing circuit, e.g., an application specific integrated circuit (ASIC), a field programmable gate array (FPGA), or other type of programmable logic devices that are configured to activate and deactivate different ones of the antenna sector units 151-154 according to a schedule or otherwise synchronized to the transmission of wireless test signals.

In one example, the device 100 includes a set 140 of switches 141-144. The switches 141-144 may each comprise a solid state switch, such as a PIN diode switch, an electromechanical or microelectromechanical switch (MEMS), and so forth. In one example, the number of switches corresponds to the number of antennas per sector, or per antenna sector unit. Thus, in the present example, where each of the antenna sector units 151-154 includes four antennas, there are four switches 141-144. In addition, as illustrated in the example of FIG. 1, each of the switches 141-144 receives an input from an antenna-LNA pair from each of the sector units 151-154. In one example, each of the switches may comprise an N×1 switch having N input ports and one output port, where N is the number of sectors, or antenna sector units. Thus, in the present example, switches 141-144 may each comprise a 4×1 switch. To illustrate, switch 141 receives an input from a first antenna-LNA pair from antenna sector unit 151, an input from a first antenna-LNA pair from antenna sector unit 152, an input from a first antenna-LNA pair from antenna sector unit 153, and an input from a first antenna-LNA pair from antenna sector unit 154, switch 142 receives an input from a second antenna-LNA pair from antenna sector unit 151, an input from a second antenna-LNA pair from antenna sector unit 152, an input from a second antenna-LNA pair from antenna sector unit 153, and an input from a second antenna-LNA pair from antenna sector unit 154, and similarly with respect to switches 143 and 144.

In one example, a timing controller 115 may provide control signals to switches 141-144 via a control line 192 to control which inputs are passed to the outputs of the respective switches 141-144. In one example, each of the switches 141-144 may receive the same control signal. Thus, all of the switches 141-144 may select a similarly positioned input port to connect to the output port. For instance, a first control signal from timing controller 115 may cause switches 141-144 to pass signals from respective first input ports to the respective output ports of the switches 141-144, while a second control signal may cause switches 141-144 to pass signals from respective second input ports to the respective output ports of the switches 141-144, and so on. It should also be noted that first input ports of the respective switches 141-144 may each be coupled to antenna-LNA pairs of a same antenna sector unit, e.g., antenna sector unit 151, while the second input ports of the respective switches 141-144 may each be coupled to antenna-LNA pairs of a different antenna sector unit, e.g., antenna sector unit 152, and so on. Thus, a control signal from timing controller 115 via control line 192 may effectively select signals from a given sector to pass through the set 140 of switches 141-144, while blocking signals from other sectors.

In one example, the timing controller 115 may synchronize the control signals to the set 140 of switches 141-144 via control line 192 with the control signals to the respective antenna sector units 151-154 (which may be further synchronized to the timing of the transmission of wireless test signals from a transmitter). Thus, for example, antenna sector unit 151 may be activated via an amplifier control signal via one of control lines 191, while the switches 141-144 may receive a switch control signal via control line 192 to select respective first input ports that are coupled to antenna-LNA pairs of the antenna sector unit 151. Accordingly, the device 100 may receive a first plurality of wireless test signals via the antennas of antenna sector unit 151, while the other antenna sector units 152-154 are deactivated. At another time, the timing control 115 may send a switch control signal to switches 141-144 via control line 192 to cause the switches 141-144 to select respective second input ports that are coupled to antenna-LNA pairs of the antenna sector unit 152. In addition, the antenna sector unit 152 may be activated via an amplifier control signal on one of lines 191, while the other antenna sector units 151, 153, and 154 are deactivated. Accordingly, the device 100 may receive a second plurality of wireless test signals via the antennas of antenna sector unit 152, while the other antenna sector units 151, 153, and 154 are deactivated. Similar procedures may be followed to receive a third plurality of wireless test signals via antenna sector unit 153 and a fourth plurality of wireless test signals via antenna sector unit 154. In one example, the timing controller 115 may receive configuration instructions, e.g., timing patterns to implement via control signals on control lines 191 and control line 192, from processor unit 110.

As further illustrated in FIG. 1, the switches 141-144 are coupled to respective baseband converters 131-134 of a set 130 of baseband converters. The baseband converters 131-134 may receive radio frequency (RF) signals from the output ports of the switches 141-144 and convert the signals into baseband signals for processing by respective receivers 121-124 in the set 120 of receivers. The receivers 121-124 may convert the baseband signals into digital representations of the wireless test signals that are received via the respective antenna sector units 151-154. For instance, the receivers 121-124 may oversample the analog baseband signals at a sampling interval under the control of timing signals from a clock circuit 112 to create the digital representations of the wireless test signals. Clock circuit 112, may comprise, for example, a rubidium reference clock or the like.

The receivers 121-124 may output the digital representations of the wireless test signals to a processor unit 110 that is configured to perform various operations for determining measures of wireless channel parameters, as described herein. For instance, the processor unit 110 may calculate, based upon the digital representations of the wireless test signals, a phase difference between wireless test signals received via respective antennas. The processor unit 110 may further determine an angle of arrival (AoA) based upon the antenna positions and the phase difference. In one example, the processor 110 may receive a reference copy or copies of the wireless test signal(s), e.g., ZC sequences, from the transmitter. Accordingly, the processor 110 may determine a carrier-to-interference (CIR) ratio by comparing a ZC sequence received via one of the antenna sector units 151-154 with a reference copy. In one example, excess delay that is slightly less than the duration of the ZC sequence can be measured. For instance, delay resolution of the device 100 may be approximately 0.6 to 1.3 nanoseconds, with a maximum excess delay of 2.7 microseconds. Alternatively, or in addition, the processor unit 110 may calculate a path loss, an excess delay, a RMS delay spread, a fade rate, a Doppler spread, a complex impulse response, or the like, from the digital representations of the wireless test signals. In one example, the processor unit 110 may comprise all or a portion of a computing device or system, such as system 500, and/or processor 502 as described in connection with FIG. 5 below.

In one example, the processor unit 110 may perform further functions, including communicating with a transmitter-side device to coordinate the timing of the transmission of the wireless test signals with activations and deactivations of LNAs, the timing of control signals to switches 141-144, to receive reference copies of wireless test signals that are transmitted, and so forth. For instance, the processor unit 110 may maintain a communication link, such a wired link, e.g., a several hundred meter cable, or an out-of band wireless link (e.g., using a different set of antennas and a different RF communication band than the antennas of antenna sector units 151-154), or the like to communicate with a device and/or a processor that is controlling the transmission of the wireless test signal via a transmitter-side antenna array. The processor unit 110 may further provide instructions to timing controller 115 based upon the information regarding the wireless test signals that is received from the transmitter side. In other words, the control signals that timing controller 115 provides via control lines 191 and control line 192 may be based upon the instructions received from the processor unit 110. In one example, the processor 110, the set 120 of receivers 121-124, and the set 130 of baseband converters 131-134 may be referred to as a "receiver stage." In one example, the receiver stage may further include the clock circuit 112 and/or the timing controller 115.

In addition, it should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

It should also be noted that for ease of illustration, various components may be omitted from the example if FIG. 1, such as power supply/voltage source(s) (e.g., +5V and/or −5V) for the processor unit 110, the receivers 120, the LNAs of sector units 151-154, the set 140 of switches 141-144, and so forth. It should also be noted that variations of the above device 100 may also be implemented in accordance with the present disclosure. For instance, in one example, antenna sector units 151-154 may comprise two antennas per antenna sector unit, eight antennas per sector unit, and so forth. In another example, device 100 may omit switches 141-144 and may instead comprise combiners, e.g., 4×1 combiners. For instance, the device 100 may still activate one of the antenna sector units 151-154, while deactivating the others via control lines 191. Thus, only RF signals from antenna-LNA pairs of the activated antenna sector unit should pass through the combiners to the set 130 of baseband converters 131-134. However, such an example may have an increased noise penalty. For example, switches 141-144 implemented as PIN diode switches may have a noise figure of 8 dB of loss, while combiners may have a noise figure of 8 dB of loss or more, with lower input port isolation and therefore higher inter-sector interference. In addition, FIG. 1 illustrates processor unit 110, timing controller 115 and timing circuit 112 as separate components. However, in another example, these components may be integrated into a single unit. In still another example, functions of a component of device 100 may be deployed to multiple components. For instance, timing controller 115 may instead comprise separate components for sending switch control signals to switches 141-144 and for sending LNA control signals to LNAs of antenna sector units 151-154. Thus, various additional changes of a same or a similar nature may be implemented in various devices in accordance with the present disclosure.

Figure 2:
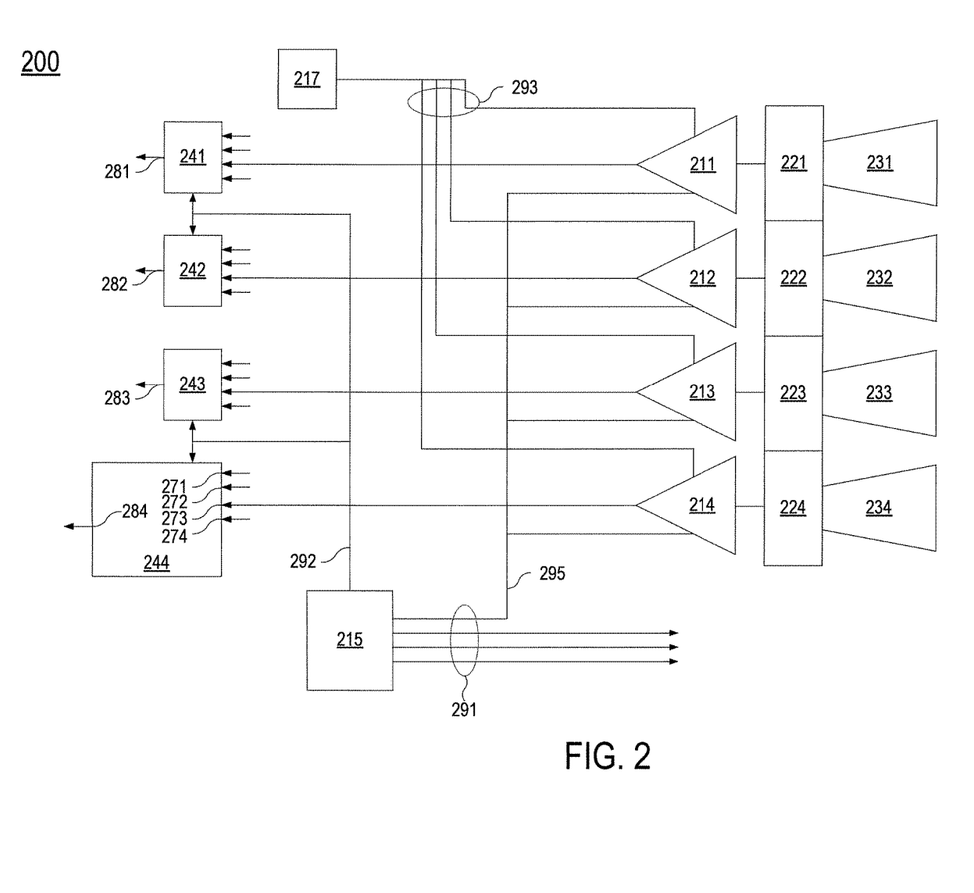
FIG. 2 illustrates a block diagram of a portion of an example device, e.g., a wireless channel sounder, in accordance with the present disclosure.

FIG. 2 illustrates an example device 200, e.g., comprising at least a portion of a wireless channel sounder, in accordance with the present disclosure. For instance, device 200 may comprise a portion of the device 100 of FIG. 1, illustrated in greater detail. As illustrated in FIG. 2, antennas 221-224 are coupled to respective low-noise amplifiers (LNAs) 211-214. Thus, there are four antenna-LNA pairs. In one example, the antennas 221-224 include or are associated with respective feed horns 231-234. In one example, antennas 221-224, LNAs 211-214, and feed horns 231-234 may represent one of the antenna sector units 151-154 of FIG. 1. As illustrated in FIG. 2, a timing controller 215 is coupled to LNAs 211-214 via a control line 295. In one example, the control line 295 is one of a plurality of control lines 291 that controls LNAs of different antenna sector units. LNAs 211-214 are also powered via a power supply/voltage source 217 via power input lines 293. As illustrated in FIG. 2, the output ports of the LNAs 211-214 are coupled to input ports of switches 241-244.

In one example, the LNAs 211-214 feed input ports of each of the respective switches 241-244. For instance, each of the switches 241-244 may have four input ports, for receiving signals from four antenna sector units. In addition, in one example, LNAs of a given antenna sector unit will each be coupled to a respective input port of one of the switches 241-244 that is in a same assigned position. For instance, the input port positions of each switch 241-244 may be arranged sequentially along one or more edges of the switch, where each of the switches 241-244 is identical, or at least has a compatible input port arrangement. Alternatively, or in addition, the same input port positions may indicate that respective input ports at different one of the switches 241-244 are addressable using a same switch control signal from timing controller 215 via control line 292. To illustrate, in the example of FIG. 2, the LNAs 211-214 may be coupled to input ports in the third position of each of the respective switches 241-244.

To further illustrate, switch 244 includes input ports 271-274. LNA 214 is coupled to input port 273, e.g., the input port in the third position at switch 244. Input port 271, e.g., the input port in the first position at switch 244, may be coupled to an LNA from a different antenna sector unit (not shown). Similarly, input ports 273 and 274 may be coupled to LNAs from still other antenna sector units, respectively. In one example, to select an antenna sector unit comprising antennas 221-224 to receive wireless test signals, the timing controller 215 may generate an amplifier control signal on control line 295 to activate LNAs 211-214 (while suppressing or deactivating LNAs from other antenna sector units via other control lines of the plurality of control lines 291). Timing controller 215 may also send a switch control signal to switches 241-244 via a control line 292 to cause switches 241-244 to select input ports corresponding to the LNAs 211-214 that are associated with the antennas 221-224. For instance, the switch control signal on control line 292 may cause switch 244 to select input port 273, and similarly with respect to the other switches 241-243. As such, switch 244 may pass radio frequency (RF) signals received via input port 273 from LNA 214 to the output port 284. Switches 241-243 may similarly select corresponding input ports and pass RF signals from the corresponding input ports to the output ports 281-283 respectively. Output ports 281-284 may be further connected or coupled to respective baseband converters, such as baseband converters 131-134 of the device 100 of FIG. 1.

When the receiving of the wireless test signals is completed for the antenna sector unit corresponding to antennas 221-224, the timing controller 215 may deactivate the LNAs 211-214 via control line 295 by sending another amplifier control signal, e.g., a disable signal, or by terminating the amplifier control signal that was used to activate the LNAs 211-213, and so forth. In addition, timing controller 215 may send an amplifier control signal via another one of the plurality of control lines 291 to activate LNAs of a different antenna sector unit, and may send another switch control signal to switches 241-244 via control line 292 to cause switches 241-244 to select a different set of input ports to connect to the respective output ports 281-284, e.g., input ports corresponding to inputs from the antenna sector unit that is activated. Alternatively, or in addition, the timing controller 215 may send a switch control signal to switches 241-244 to disable the switches, e.g., if there are no more sectors to receive wireless test signals.

It should be noted that the example of FIG. 2 is just one example of a portion of a wireless channel sounder in accordance with the present disclosure, and that other, further and different configurations may be implemented in additional examples. For instance, the timing controller 215 may be configured via a processor or computing device, e.g., a management console or the like, in order to synchronize the activating and deactivating of LNAs of different antenna sector units to the pattern of wireless test signals that are transmitted, e.g., on a per-sector, or per-antenna sector unit basis. In this regard, in one example, the timing controller 215 may be omitted as a separate component and the control signals may be provided via a device and/or processor that is configured to perform various operations for determining measures of wireless channel parameters, such as processor unit 110 of FIG. 1. Furthermore, power supply/voltage source 217 is illustrated as powering LNAs 211-214 via power input lines 293. However, it should be understood that the same or a different power supply/voltage source may also power switches 241-244. In still another example, device 200 may implement more or less antennas in the portion of the device 200 that is illustrated in FIG. 2, e.g., two or more antennas per sector/antenna sector unit. In addition, as mentioned above, the device 100 of FIG. 1 may be modified to implement combiners in the place of switches 141-144. Similarly, switches 241-244 (and the control line 292) may be omitted from the example of FIG. 2 and replaced with passive N×1 combiners. Thus, these and other modifications are all contemplated within the scope of the present disclosure.

Figure 3:
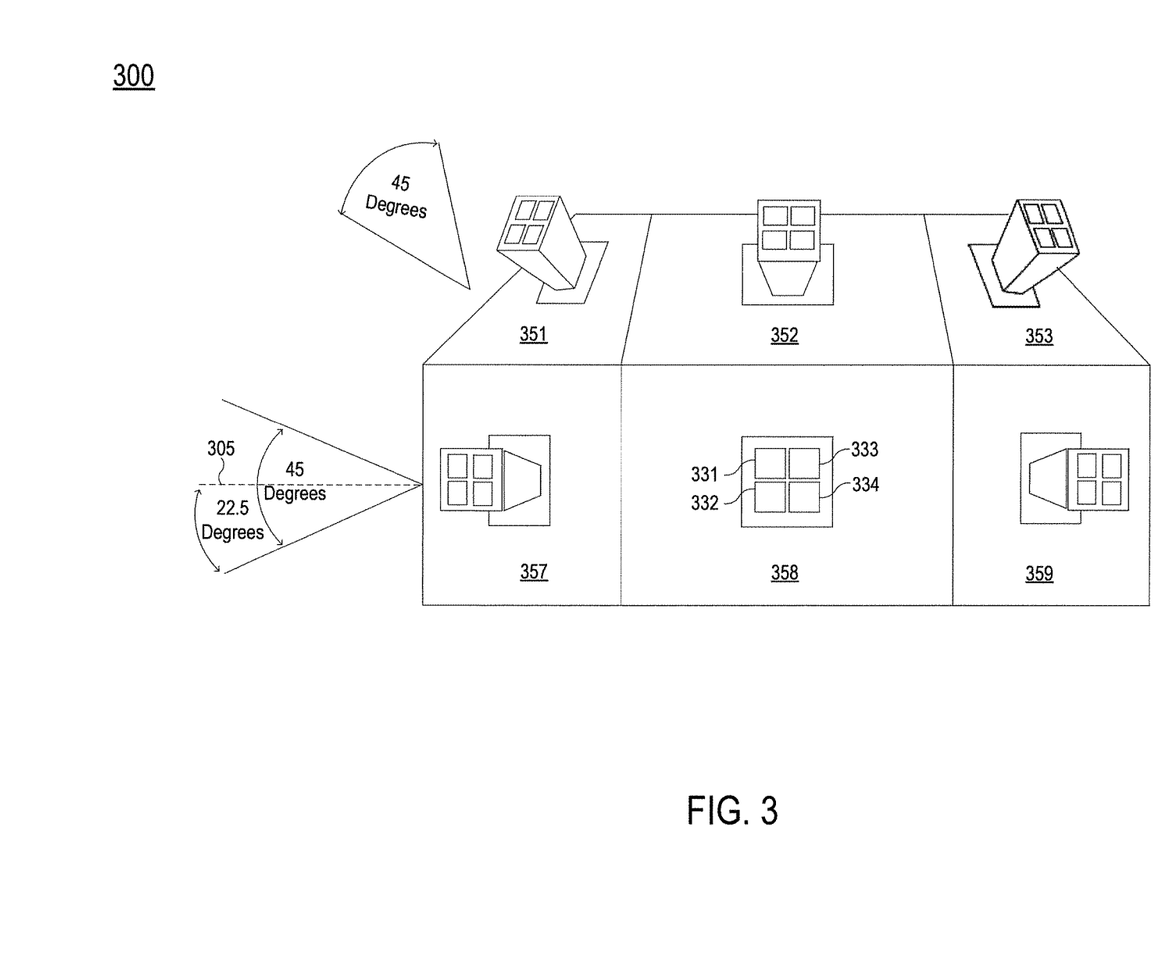
FIG. 3 illustrates a perspective view of an example device, e.g., a wireless channel sounder, in accordance with the present disclosure.

FIG. 3 illustrates a perspective view of an example device 300, e.g., a wireless channel sounder, in accordance with the present disclosure. As illustrated in FIG. 3, the device 300 includes a plurality of antenna sectors units 351-353 and 357-359. The device 300 may include additional antenna sector units that are not visible in the view of FIG. 3. Thus, it should be understood that in one example, the device 300 may include a total of 16 sectors (and 64 antennas, in total). In one example, each of the antenna sectors units 351-353 and 357-359 covers 45 degrees in azimuth and 45 degrees in elevation. For example, with respect to elevation beam coverage, antenna sectors unit 357 (and antenna sector units 358 and 359) cover from −22.5 degrees below horizon (305) to 22.5 degrees above horizon (305) at half-power beamwidth, while antenna sector unit 351 (and antenna sector units 352 and 353) cover from 22.5 degrees above horizon (305) to 67.5 degrees above horizon (305) at half-power beamwidth. With respect to azimuthal beam coverage, the device 300 may include two groups of eight sectors, e.g., an upper group that includes sectors 351-353 and five other sectors (not visible in the view of FIG. 3) and a lower group that includes sectors 357-359 and five other sectors (also not visible in the view of FIG. 3). With each sector having a 45 degree half-power beamwidth, and where the beamwidths of adjacent sectors are non-overlapping, the upper group and lower group each cover 360 degrees in azimuth.

Each of the antenna sector units of device 300 includes a plurality of antennas, or antenna elements. For instance, the example of FIG. 3, each of the antenna sectors units 351-353 and 357-359 includes four antennas arranged in a quad-array. To further illustrate, antenna sector unit 358 includes feed horns 331-334 which feed four respective antenna-LNA pairs (not shown). The other antenna sectors units 351-353, 357 and 359 may be similarly configured. It should be noted that in other examples, antenna sector units may be deployed with different numbers of antennas, LNAs, and feed horns. For instance, in one example, an antenna sector unit in accordance with the present disclosure may have at least two antennas (and hence at least two corresponding LNAs and at least two corresponding feed horns).

In one example, antenna sectors units 351-353 and 357-359 (and the remaining antenna sector units of device 300 that are not visible in FIG. 3) may be activated and deactivated in a sequence. In one example, a transmitter may transmit wireless test signals via seven antennas of a switched antenna array. In one example, the device 300 may receive 32 samples of the wireless test signals from each antenna of the antenna array of the transmitter at each antenna sector of device 300. Thus, for instance, there may be 7×64 multiple input multiple output (MIMO) channels from which 32 samples may be obtained for each channel. In addition, in one example, the device 300 may have four receivers (not shown), e.g., arranged as illustrated in FIG. 1 and/or FIG. 2. Thus, measurements for wireless test signals from each transmitter antenna may be taken on a per-sector basis, e.g., per quad array of the device 300.

It should be noted that the example of FIG. 3 is just one example of a wireless channel sounder in accordance with the present disclosure, and that other, further and different configurations may be implemented in additional examples. For instance, more or less sectors having narrower or wider beamwidths may be used to cover 360 degrees in azimuth, sectors may be arranged to cover more or less range in elevation, more or less antennas per sector may be deployed, a linear array or multiple linear arrays may be used instead of a quad array/square array, and so forth.

Figure 4:
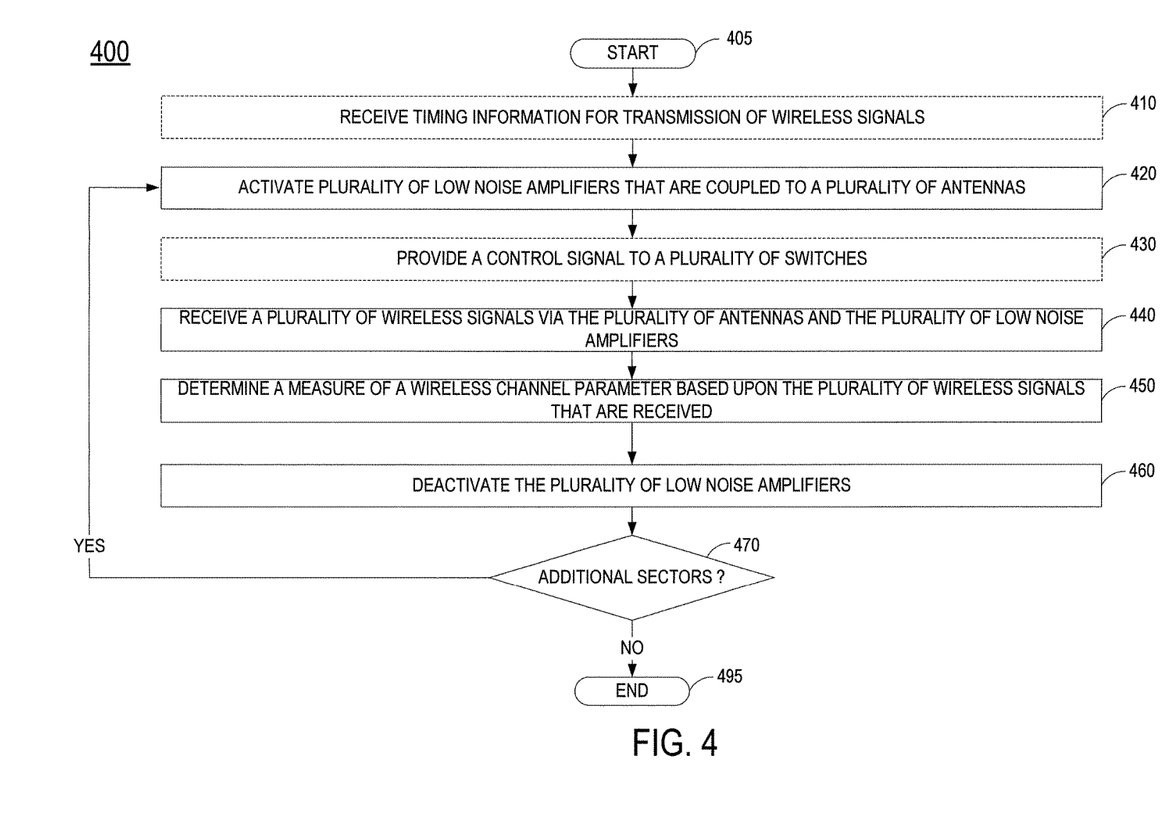
FIG. 4 illustrates a flowchart of an example method for determining measures of wireless channel parameters.

FIG. 4 illustrates a flowchart of an example method 400 for determining measures of wireless channel parameters, in accordance with the present disclosure. In one example, steps, functions and/or operations of the method 400 may be performed by a device as illustrated in FIG. 1 and/or FIG. 2, e.g., a wireless channel sounder, or any one or more components thereof, such as processor unit 110, or processor unit 110 in conjunction with timing controller 115 or timing controller 215, baseband converters 131-134, receivers 121-124, switches 141-144, LNAs 211-214, and so forth. In one example, the steps, functions, or operations of method 400 may be performed by a computing device or system 500, and/or processor 502 as described in connection with FIG. 5 below. For instance, system 500 may represent a device, e.g., a wireless channel sounder, or a processor unit and/or other components of a wireless channel sounder of the present disclosure. For illustrative purposes, the method 400 is described in greater detail below in connection with an example performed by a processor, such as processor 502. The method 400 begins in step 405 and may proceed to optional step 410 or to step 420.

At optional step 410, the processor receives timing information for transmission of wireless signals from a transmitter, e.g., wireless test signals for use in measuring one or more wireless channel parameters. For instance, the processor may receive the timing information from another processor, controller, or other device associated with the transmitter. In one example, the transmitter may comprise a switched array with antennas having orientations where respective antenna beams cover respective portions of 120 degrees in azimuth with little to no overlap at half power beamwidth. For instance, the array may comprise seven antennas, each with 18.5 degrees of half-power beamwidth to cover a 120 degree (azimuthal) sector. Thus, in one example, the timing information may indicate a number of test signals to be transmitted from each antenna, a duration of the test signal(s), and so forth. In one example, additional information may be included with the timing information, such as a transmit power, information on transmit polarization(s), reference copies of the wireless signals, and so forth. In one example, the timing information may relate to transmission of at least a first plurality of wireless signals. In another example, the timing information may relate to transmission of at least a first plurality of wireless signals and a second plurality of wireless signals. In one example, the information received at optional step 410 may be received out-of-band, e.g., via a wired connection between the transmitter and a device of the processor.

At step 420, the processor activates a first plurality of low noise amplifiers (LNAs) that are coupled to a first plurality of antennas. For instance, the processor may provide a control signal to turn on the first plurality of LNAs. In one example, the control signal may be provided via a timing controller in communication with the processor, such as timing controller 115 of FIG. 1, or timing controller 215 of FIG. 2. In addition, in one example, the activating of the first plurality of LNAs may be synchronized to the transmission of the first plurality of wireless signals, e.g., based upon the timing information that may be received at optional step 410.

At optional step 430, the processor provides a first control signal to a plurality of switches. For example, the first control signal causes each of the plurality of switches to pass one of the first plurality of wireless signals from a first of a plurality of input ports to an output port of the respective switch. The switches may comprise switches 141-144 of FIG. 1, or switches 241-244 of FIG. 2, for example. In one example, the control signal may be provided via a timing controller.

At step 440, the processor receives the first plurality of wireless signals via the first plurality of antennas and the first plurality of LNAs. In particular, since the first plurality of LNAs are turned on and activated, the wireless signals that are received via the first plurality of antennas may be amplified and passed through the first plurality of LNAs as radio frequency (RF) signals. In one example, the RF signals may further pass through the plurality of switches to a plurality of baseband converters and to a plurality of receivers to digitally sample baseband signals that are output by the baseband converters. In particular, the switches may be arranged via the first control signal of optional step 430 to select respective input ports of the plurality of switches to pass the RF signals from the first plurality of LNAs to the output ports of the respective switches. In addition, the baseband converters may convert the RF signals into baseband signals, which may then be sampled at a given sampling rate to create digital representations of the first plurality of wireless signals.

At step 450, the processor determines a first measure of a wireless channel parameter based upon the first plurality of wireless signals that are received. For instance, the wireless channel parameters may include: multipath direction(s) or angle(s) or arrival, a carrier-to-interference ratio, a path loss, a delay spread, a Doppler spread, a fade rate, and so forth. To illustrate, with respect to angle of arrival (AoA), the processor may calculate, based upon the digital representations of the wireless signals, phase difference(s) between wireless signals received via respective antennas. The processor may further determine an angle of arrival (AoA) based upon the antenna positions and the phase difference(s).

At step 460, the processor deactivates the first plurality of LNAs. For example, the processor may send a disable signal, terminating an enable signal, etc. In one example, the deactivating may be provided via a timing controller. In addition, in one example, the deactivating the first plurality of LNAs may be synchronized to the transmission of the first plurality of wireless signals, e.g., based upon the timing information that may be received at optional step 410.

At step 470, the processor determines whether there are additional sectors for which measurements are to be taken. If there are no additional sectors, the method 400 may proceed to step 495 where the method ends. However, if there are additional sectors, the steps 410-460 may be repeated with respect to the additional sectors, or antenna sector units, e.g., of a wireless channel sounder device of the processor, and/or with respect to additional antennas of a switched antenna array of the transmitter. For example, the processor may activate a second plurality of LNAs that are coupled to a second plurality of antennas at step 420, receive a second plurality of wireless signals via the second plurality of antennas and the second plurality of LNAs at step 440, determine a second measure of the wireless channel parameter based upon the second plurality of wireless signals that are received, at step 450, and deactivate the second plurality of LNAs at step 460. At step 470, a determination may again be made whether there are additional sectors for which measurements are to be taken. If so, the steps 410-460 may continue to be repeated with respect to additional sectors or antenna sector units, and/or with respect to additional antennas of a switched antenna array of the transmitter, e.g., for as many antenna sector unit—transmitter antenna combinations remain. If, however, there are no additional sectors, the method 400 may proceed to step 495 where the method ends.

In addition, it should be noted that although not specifically specified, one or more steps, functions or operations of the method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation or involve a decision do not necessarily require that both branches of the determining operation be practiced. In other words, one of the branches of the determining operation can be deemed as an optional step. It should be noted that the method 400 may be expanded to include additional steps. In addition, one or more steps, blocks, functions, or operations of the above described method 400 may comprise optional steps, or can be combined, separated, and/or performed in a different order from that described above, without departing from the example embodiments of the present disclosure.

Figure 5:
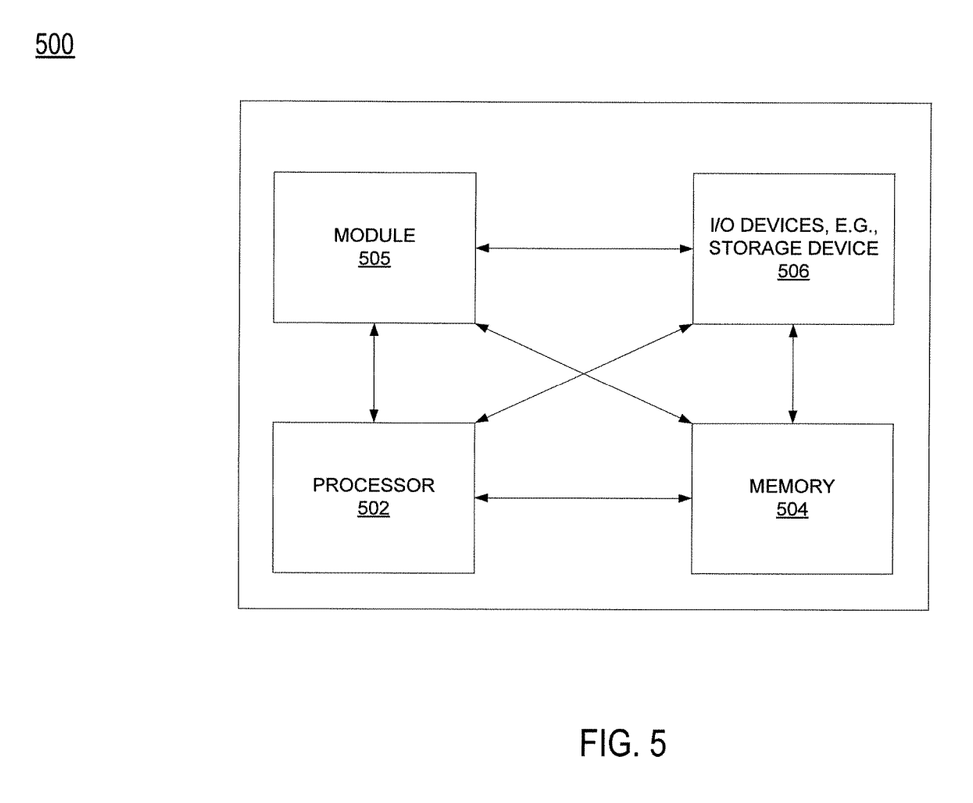
FIG. 5 illustrates an example high-level block diagram of a computing device specifically programmed to perform the steps, functions, blocks, and/or operations described herein.

FIG. 5 depicts a high-level block diagram of a computing device specifically programmed to perform the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for determining measures of wireless channel parameters, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one embodiment, instructions and data for the present module or process 505 for determining measures of wireless channel parameters (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for determining measures of wireless channel parameters (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a plurality of antennas to receive wireless signals from a wireless transmitter and to output radio frequency signals based upon the wireless signals that are received;
   a plurality of low noise amplifiers, coupled to the plurality of antennas, to amplify the radio frequency signals; and
   a receiver stage to generate, based upon the radio frequency signals, digital representations of the wireless signals that are received via the plurality of antennas and to determine a measure of at least one wireless channel parameter from the digital representations of the wireless signals, wherein the receiver stage comprises:
      a plurality of baseband converters to convert the radio frequency signals that are amplified into baseband signals;
      a plurality of baseband receivers to receive the baseband signals and generate, from the baseband signals, the digital representations of the wireless signals that are received via the plurality of antennas; and
      a processor to determine the measure of the at least one wireless channel parameter from the digital representations of the wireless signals; and
   a plurality of switches between the plurality of low noise amplifiers and the receiver stage, each of the plurality of switches including:
      input ports coupled to respective low noise amplifiers of the plurality of low noise amplifiers; and an output port coupled to one of the plurality of baseband converters, wherein each of the plurality of switches is to select one of the input ports to connect to the output port.

2. The device of claim 1, wherein each of the plurality of switches is further to:
select the one of the input ports to connect to the output port based upon a switch control signal.

3. The device of claim 1, wherein the plurality of switches comprises:
PIN diode switches; or
electromechanical switches.

4. The device of claim 1, wherein each of the plurality of low noise amplifiers includes a control port to receive a control signal, the control signal to activate or deactivate the each of the plurality of low noise amplifiers.

5. The device of claim 1, wherein the plurality of antennas and the plurality of low noise amplifiers are arranged into a plurality of sectors, each of the plurality of sectors including at least two of the plurality of antennas and at least two of the plurality of low noise amplifiers.

6. The device of claim 5, wherein the plurality of sectors has non-overlapping half-power beamwidths and covers 360 degrees in azimuth.

7. The device of claim 5, wherein the plurality of low noise amplifiers includes control ports to receive control signals, wherein the control signals are to activate and deactivate low noise amplifiers of the plurality of low noise amplifiers, wherein the low noise amplifiers of the plurality of low noise amplifiers are activated and deactivated via the control signals on a per-sector basis.

8. The device of claim 7, wherein the control signals activate and deactivate the low noise amplifiers of the plurality of low noise amplifiers on a per-sector basis in synchronization with a pattern of transmissions of the wireless signals from the wireless transmitter.

9. The device of claim 1, wherein the wireless signals from the wireless transmitter comprise test signals for calculating the at least one wireless channel parameter.

10. The device of claim 1, wherein the at least one wireless channel parameter comprises a plurality of wireless channel parameters, wherein the receiver stage is further to determine measures of the plurality of wireless channel parameters from the digital representations of the wireless signals.

11. The device of claim 10, wherein the plurality of wireless channel parameters comprises:
a complex impulse response;
an angle of arrival;
a carrier to interference ratio;
a path loss;
a delay spread;
a Doppler spread; or
a fade rate.

12. A method comprising:
receiving, via a plurality of antennas of a receiver device, wireless signals from a wireless transmitter;
outputting, via the plurality of antennas, radio frequency signals based upon the wireless signals that are received;
amplifying, via a plurality of low noise amplifiers of the receiver device, the radio frequency signals;
generating, via a receiver stage of the receiver device, based upon the radio frequency signals, digital representations of the wireless signals that are received via the plurality of antennas, wherein the generating comprises:

converting, via a plurality of baseband converters, the radio frequency signals into baseband signals;
receiving, via a plurality of baseband receivers, the baseband signals; and
generating, via the plurality of baseband receivers, from the baseband signals, the digital representations of the wireless signals that are received via the plurality of antennas; and
determining, via the receiver stage, a measure of a wireless channel parameter from the digital representations of the wireless signals, wherein the receiver device includes a plurality of switches between the plurality of low noise amplifiers and the receiver stage, each of the plurality of switches including:
input ports coupled to respective low noise amplifiers of the plurality of low noise amplifiers; and
an output port coupled to one of the plurality of baseband converters, wherein each of the plurality of switches is to select one of the input ports to connect to the output port.

13. The method of claim 12, further comprising:
selecting, based upon a switch control signal, the one of the input ports to connect to the output port of each of the plurality of switches.

14. The method of claim 12, wherein each of the plurality of low noise amplifiers includes a control port to receive a control signal, the control signal to activate or deactivate the each of the plurality of low noise amplifiers.

15. The method of claim 12, wherein the wireless signals from the wireless transmitter comprise test signals for calculating the at least one wireless channel parameter.

16. The method of claim 12, wherein the plurality of antennas and the plurality of low noise amplifiers are arranged into a plurality of sectors, each of the plurality of sectors including at least two of the plurality of antennas and at least two of the plurality of low noise amplifiers.

17. The method of claim 16, wherein the plurality of sectors has non-overlapping half-power beamwidths and covers 360 degrees in azimuth.

18. The method of claim 16, wherein the plurality of low noise amplifiers includes control ports to receive control signals, wherein the control signals are to activate and deactivate low noise amplifiers of the plurality of low noise amplifiers, wherein the low noise amplifiers of the plurality of low noise amplifiers are activated and deactivated via the control signals on a per-sector basis.

19. The method of claim 18, wherein the control signals activate and deactivate the low noise amplifiers of the plurality of low noise amplifiers on a per-sector basis in synchronization with a pattern of transmissions of the wireless signals from the wireless transmitter.

20. A non-transitory computer-readable storage medium storing instructions which, when executed by a processor, cause the processor to perform operations, the operations comprising:
amplifying, via a plurality of low noise amplifiers of a receiver device, radio frequency signals that are output via a plurality of antennas of the receiver device, the radio frequency signals based upon wireless signals that are received via the plurality of antennas;
generating, via a receiver stage, based upon the radio frequency signals, digital representations of the wireless signals that are received via the plurality of antennas, wherein the generating comprises:
converting, via a plurality of baseband converters, the radio frequency signals into baseband signals;

receiving, via a plurality of baseband receivers, the baseband signals; and generating, via the plurality of baseband receivers, from the baseband signals, the digital representations of the wireless signals that are received via the plurality of antennas; and determining a measure of a wireless channel parameter from the digital representations of the wireless signals, wherein the receiver device includes a plurality of switches between the plurality of low noise amplifiers and the receiver stage, each of the plurality of switches including:

input ports coupled to respective low noise amplifiers of the plurality of low noise amplifiers; and an output port coupled to one of the plurality of baseband converters, wherein each of the plurality of switches is to select one of the input ports to connect to the output port.

\* \* \* \* \*